Dec. 21, 1943.  W. R. SPILLER ET AL  2,337,069
BRAKE MECHANISM
Filed April 7, 1941  2 Sheets-Sheet 2
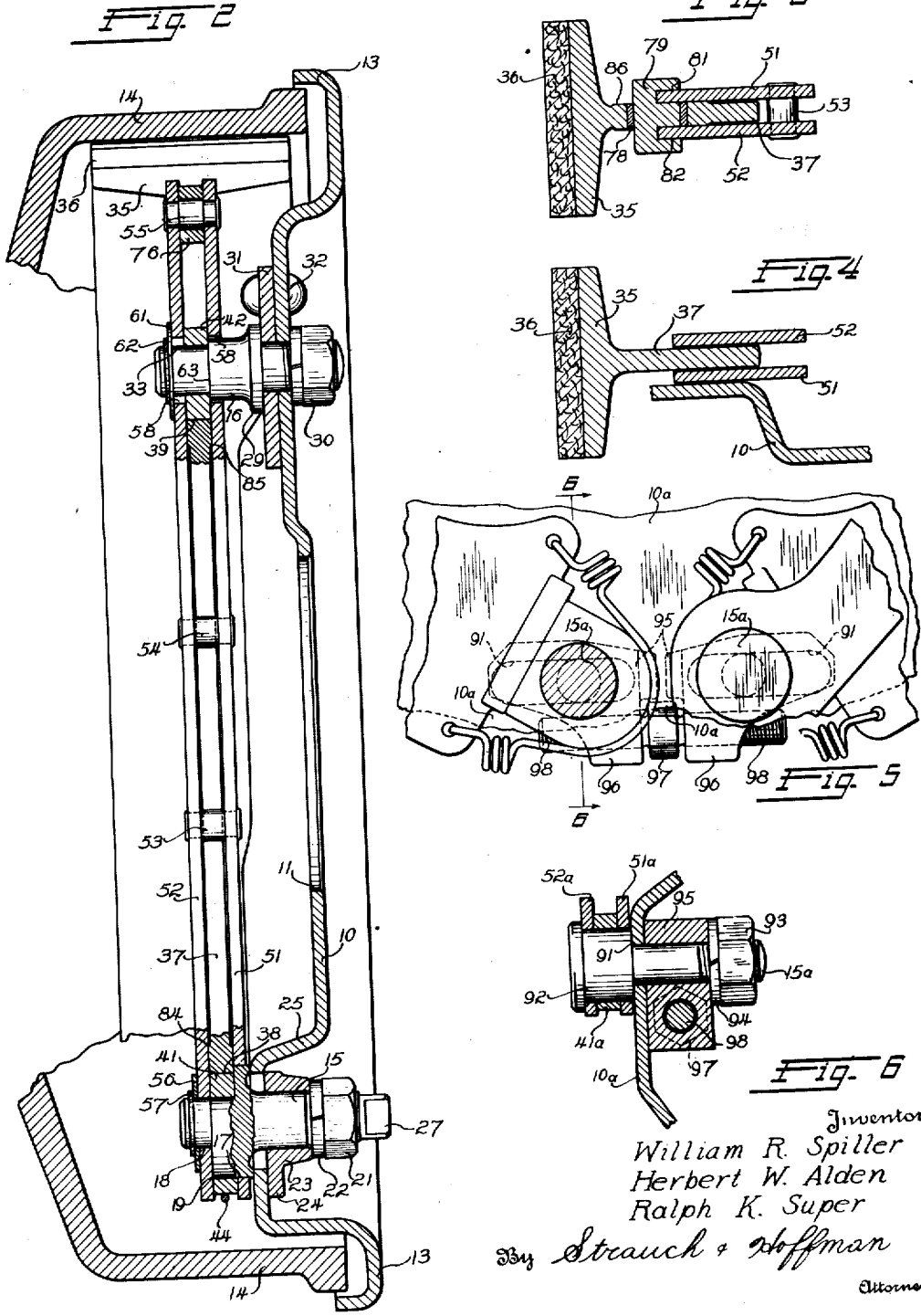
Inventors
William R. Spiller
Herbert W. Alden
Ralph K. Super
By Strauch & Hoffman
Attorneys Patented Dec. 21, 1943

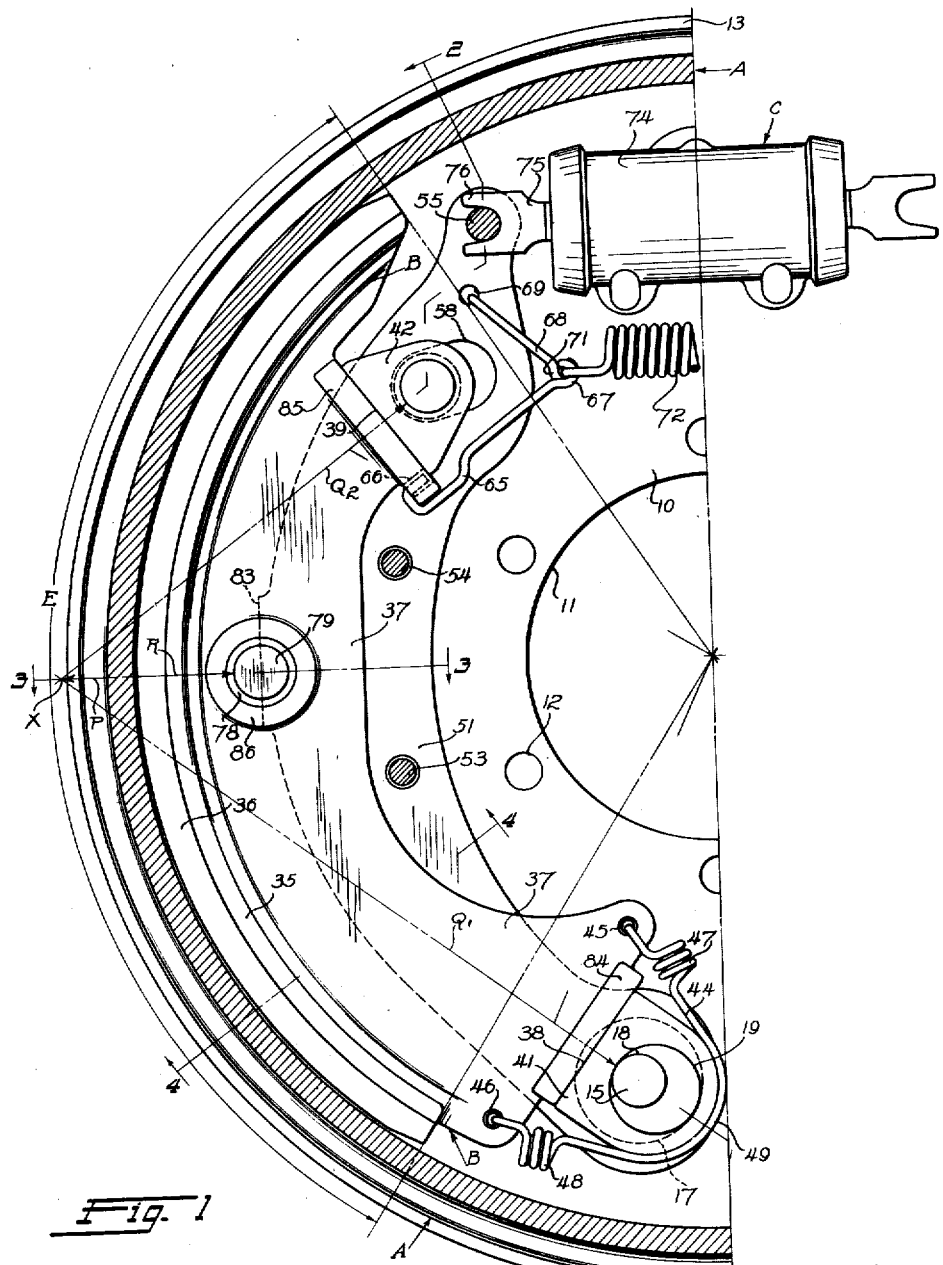

2,337,069

UNITED STATES PATENT OFFICE 2,337,069

BRAKE MECHANISM

William R. Spiller, Dayton, Ohio, and Herbert W. Alden and Ralph K. Super, Detroit, Mich., assignors to The Timken-Detroit Axle Company, Detroit, Mich., a corporation of Ohio Application April 7, 1941, Serial No. 387,314

24 Claims. (Cl. 188—78)

The present invention relates to brake mechanisms, and more particularly to internal expanding drum brakes for automotive vehicles, although it is not limited to such use.

In a conventional brake, the brake shoe is pivoted on a fixed anchor pin and rocks about a definite axis, between engaged and disengaged positions. Although in such a brake there is a direct line relationship between the force applied and the braking torque developed, it is open to the disadvantage that through a phenomenon known as "toe grab," or self-locking, the shoe will often grab and cause uneven braking, and/or uneven wear of the brake lining. Circumferential extent or span of the lining in such brakes must be held to small limits; the anchor pin mounting must be maintained closely adjacent the drum; and the coefficient of the lining must be kept comparatively low to avoid toe grab and self-locking of the shoe. Each of these factors serves to decrease the braking power or torque capacity of the brake.

In the "Servo" brakes of the prior art, a primary shoe is mounted for floating movement and is linked to a secondary shoe, which in turn is pivoted on an anchor pin. The braking torque of such brakes is greater than a conventional brake of given size, but they are open to serious disadvantages. The major difficulty of this brake is that it is not completely controllable under all conditions. For one thing, a release of, or reduction in, pedal pressure is not always reflected as a corresponding cessation of, or reduction in, braking torque, with the result that the brake is not altogether reliable in operation.

In Hayes et al. Patent No. 2,208,293, granted July 16, 1940, there is disclosed a brake mechanism embodying a shoe assembly mounted for pivotal and sliding movement and designed to overcome the toe grabbing defect of conventional pivoted shoes, and to also permit the braking power to be increased and an appreciable degree of self-energizing action achieved, by shifting the anchor pin inwardly toward the axis of the brake drum, and increasing the degree to which the lining at the toe end of the shoes is extended.

Although the patented structure represents a substantial advance in the art over the other brake mechanisms of the prior art, from the standpoints of construction and operation it is not altogether successful and falls short of a brake having all of the desired operating characteristics. The Hayes et al. brake, by reason of the slotted shoe end construction, is subject to structural distortion or failure when excessive braking torques are imposed upon the mechanism, and also, because the braking torque is taken solely at one end of each shoe, the increased braking torque due to anchor pin location is achieved for only one direction of rotation for each shoe. When the drum rotation is reversed the shoe functions substantially the same as the trailing shoe of a conventional anchored brake shoe assembly. Therefore, the improvements made by Hayes et al. are only available for one direction of rotation of each shoe.

It is the major object of this invention to provide a brake mechanism having all of the advantages of the Hayes et al. brake, and in addition possesses highly important structural features which render it extremely rugged and also give it highly improved operating characteristics.

Another important object is to provide a novel multi-shoe brake mechanism which is so designed that toe grab is eliminated; the shoes are floatingly mounted for movement into full engagement with the drum; and each shoe possesses substantially the same braking characteristics in both directions of rotation of the drum.

A further object is to provide a brake mechanism embodying means for supporting each shoe for floating movement toward and away from the drum in such manner that, when either end of the shoe is engaged with the drum, the opposite end may move toward and bring the full area of the lining into engagement with the drum.

A further object is to provide a novel mount for a floating brake shoe, embodying an inclined abutment assembly at each end of the shoe, for imparting predetermined braking characteristics to the shoe when forward or rearward brake torquing reactions are applied thereto.

The invention also aims to provide a brake mechanism embodying a novel lever assembly designed to operably support each shoe for floating movement, and to also apply actuating forces to the central portion of the shoe.

Another object is to provide a brake shoe mounting which anchors the shoe at both ends and yet permits free pivotal movement about each end as well as free translational movements of each end of the shoe toward and away from the drum.

A further object is to provide a brake mechanism in which each shoe is supported on two anchor pins, symmetrically located with respect to the center of pressure of the resultant forces acting on the shoe, the anchor pins being operable to impart similar operating characteristics to the shoe in both directions of drum rotation.

Further objects are to provide novel adjusting means, novel level fulcrum means, novel anchor means, and to generally improve and refine other features of the brake mechanism of the prior art, which will become apparent as the specification proceeds in conjunction with the annexed drawings.

Figure 1 is a fragmental elevational view of a brake mechanism embodying the invention, with the brake drum and certain other parts broken away to more clearly illustrate the construction involved;

Figure 2 is a vertical sectional view taken substantially along line 2—2 of Figure 1, looking in the direction of the arrows;

Figure 3 is a fragmental sectional view through the brake shoe and lever pivot assembly, taken substantially on the line 3—3 of Figure 1;

Figure 4 is a fragmental sectional view taken on the line 4—4 of Figure 1;

Figure 5 is a fragmental sectional view of a modified form of brake anchor adjusting mechanism which may be used in the construction shown in Figure 1, and also forming part of the invention; and Figure 6 is a sectional view taken substantially along the line 6—6 of Figure 5.

With continued reference to the drawings, wherein like reference characters have been employed to designate like parts throughout the several views thereof, the brake mechanism broadly comprises a brake drum A, a pair of brake shoes B and a hydraulic piston and cylinder assembly C, although it is to be understood that a cam or any well-known form of link construction may be used instead of hydraulic or pneumatic pressure for actuating the brake.

The brake assembly is carried by a foundation plate 10, having a central opening 11 designed to fit over any suitable form of axle construction and has a plurality of openings 12 through which fastening screws or rivets are inserted to secure the foundation plate to a flange on the axle. Plate 10 is flanged to provide a dirt-excluding lip 13 and a brake drum 14 is mounted for rotation on the wheel or hub assembly in cooperative relationship with lip 13 in well known manner. The brake of the invention embodies both a novel floating mount for the brake shoes, which imparts improved braking characteristics to the mechanism, and also a novel pressure applying lever assembly. The novel floating brake mount will first be described.

Rigidly secured to backing plate 10 is a pair of anchor pins 15 and 16. Pin 15 is provided with large and small diameter concentric journal portions 17 and 18, respectively, and an intermediate eccentric portion 19. The large diameter journal portion is pulled into tight engagement with plate 10 by means of a nut 21, a lock washer 22 and a spacer member 23. The latter is provided with a flange 24, and is located in a cupped portion 25 formed in the foundation plate. Spacer 23 is preferably riveted to the foundation plate, so as to provide a rugged journal for pin 15.

Pin 15 is provided with a squared end 27, so that by loosening nut 21 the pin may be engaged by a wrench and turned to rotate the eccentric, and thereby adjust the brake in a manner to be hereinafter pointed out.

Upper pin 16 is provided with a shoulder 29, which is pulled into tight engagement with a reinforcing plate 31, secured in turn to backing plate 10 by means of rivets 32. Pin 16 is provided with a smooth journal portion 33. The shoulders of pins 15 and 16 are preferably serrated and cooperate with serrations on backing plate 10 and plate 31 (not shown) for preventing the pins from rotating.

Anchor pins 15 and 16 constitute the sole support for the shoe and lever actuating mechanism and since the two pairs of actuating pins support the two shoes in exactly the same manner, the right-hand shoe, which is of identical construction, has not been illustrated (Figure 1) the description of the left-hand shoe clearly constituting a full disclosure of the invention.

The brake shoes may be of any desired construction and each embodies a cylindrical portion 35 having brake lining material 36 secured thereto in any suitable manner, as for instance by rivets or the like, and may be applied in two or more sections. The shoe has a central web or flange 37 provided at its opposite ends with abutment faces 38 and 39, which cooperate with link or abutment members 41 and 42, respectively.

The abutment members are carried by the anchor pins, and by reason of their novel construction, they directly absorb the braking torque reaction of the drum in both directions of rotation. Abutment member 41 is pivoted upon eccentric portion 19 of anchor pin 15, so that by rotating the anchor pin the abutment member is correspondingly actuated to advance or retract the lower end of the shoe with respect to the drum. The upper abutment member 42 is pivoted upon anchor pin 16.

The coacting faces of the abutment members are comparatively long, so as to avoid high localized pressures, and to also insure pivotal movement of the abutment members in response to the application of drum reaction forces thereto and prevent the abutment members from swinging around and locking the shoes in engaged position.

Preferably resilient means is employed to constantly maintain the ends of the shoes in engagement with their abutment members when the brake is released, as shown in Figure 1. A tension spring 44 has its opposite ends hooked into openings 45 and 46 in the brake shoe flange, and is provided with two coiled portions 47 and 48. The intermediate portion 49 of the spring 44 extends around the outside of abutment member 41. The spring constantly urges face 38 of the brake shoe toward engagement with abutment member 41, so that no independent pivoting movement of the latter can occur. By acting along a line normal to face 38, there is no tendency for the spring to slide the shoe end across the face of member 41. A somewhat different spring arrangement is employed for maintaining abutment member 42 in engagement with the upper end of the brake shoe, and will be described in conjunction with the description of the lever assembly.

Although the brake shoes may be actuated toward the brake drum by any suitable actuating mechanism, we preferably employ the following novel lever assembly because it maintains accurate control over all movement of each shoe, cooperates with the abutment members to guide the shoe for accurate movement toward and away from the drum, and also applies actuating forces substantially at the mid-portion of the shoe, so as to effect a substantially uniform distribution of braking pressure.

A pair of levers 51 and 52, of substantially identical shape, are secured together in spaced parallel relationship by means of spacer pins 53, 54 and 55. Each pin is provided with an enlarged central portion providing opposed shoulders against which the levers are tightly held in place and by riveting ends of the pins.

Lever 51 is journalled on the large diameter portion 17 of anchor pin 15, while lever 52 is journalled on small diameter portion 18. The lever assembly is detachably secured in place on the lower anchor pin by means of a washer 56 and a split ring 57, which is sprung into a groove in the anchor pin.

Each lever, adjacent its upper end, is provided with an elongated slot 58 for clearing the upper anchor pin. The ends of slot 58 in lever 51 cooperate with the upper anchor pin to limit extreme movement of the levers in both directions. As shown in Figure 1, the brake shoe is in released position, and the left-hand end of slot 58 in lever 51 is engaged with the upper anchor pin.

The upper end of the lever assembly is maintained in cooperative relationship to the foundation plate by means of a washer 61 and a snap ring 62 sprung into a groove in anchor pin 16. The upper end of the lever assembly is accordingly freely rockable in a plane normal to the upper anchor pin, but is restrained against movement axially of the pin. As seen in Figure 2, a shoulder 63 on the pin restrains link member 42 against movement to the right, which in turn restrains the lever assembly against similar movement, and the snap ring assembly just described prevents movement of the assembly in the opposite direction.

Each brake shoe is constantly urged toward disengaging position by means of a novel retracting spring assembly, which also constantly urges abutment face 39 of the brake shoe toward engagement with its abutment member 42. A short link member 65 has one end thereof hooked in a bore 66 in the brake shoe web, and is provided at its free end with an eye 67. Somewhat similar link member 68 is hooked into an opening 69 in the upper end of lever 51, and is provided at its free end with an eye 71. A tension spring 72 is hooked into eyes 67 and 71 at one end and at the other end is hooked into the corresponding eyes of the opposite brake shoe and lever assembly. Spring 72, acting through links 65 and 68, accordingly, constantly urges the brake shoe away from the drum and toward the engagement with its abutment member 42, and also urges the lever assembly into retracted position, in engagement with pin 16. Link 68 confines the pull of spring 72 upon link 65 to a direction substantially normal to face 39, with the result that there is no tendency to slide the upper end of the shoe across the face of member 42.

The lever assemblies may be actuated by hydraulic, pneumatic or mechanical means of any desired character, it only being necessary to spread the upper ends of the lever assemblies to actuate the brake. In the present instance, however, we have illustrated a well-known type of hydraulic mechanism embodying a cylinder 74 having a piston in each end thereof. Piston rods 75 are provided with forked portions 76, which fit over, and fulcrum against, the upper spacer pin 55 of each lever assembly.

It is accordingly apparent that, when pressure is applied to cylinder 74, rod 75 will move outwardly and cause the lever assemblies to fulcrum about lower anchor pins 15 as axes. Rocking movement of the lever assembly is transmitted to the brake shoes by a novel fulcrum assembly which applies the forces substantially centrally of the shoe and is so designed as to not interfere with free rocking movement thereof, thereby permitting the shoe to automatically find a seat on the drum in full surface engagement therewith.

Journalled in a bushing 78 in brake shoe flange 37 is a trunnion member 79 having a pair of slots 81 and 82 formed therein. (Figure 3). Levers 51 and 52 are each provided with a straight edge 83, which slidably coacts with the grooves in the trunnion member. The grooves, being located adjacent the diameter of the trunnion, provide long bearing surfaces of adequate area to sustain the loads imposed by the levers, which are constantly maintained in full surface engagement with the bottoms of the grooves.

The lever assemblies are accordingly operative to apply forces to the central portion of the brake shoe through trunnion member 79, and at the same time individual lever members may freely slide relatively to the shoe in the trunnion member slots, thereby permitting any self-aligning action to freely take place. In order to further insure free sliding movement of the shoe web between the latter, slightly raised bosses 84 and 85 are provided on the brake shoe web adjacent abutment faces 38 and 39, respectively, and also a circular boss 86 is formed on the web adjacent trunnion member 79. Working clearances are provided between the bosses and the brake shoe flange, but the parts fit sufficiently close to insure accurate guiding of the shoe.

The novel brake mechanism of the invention embodies what may be termed a shifting anchor for each shoe. For instance, if the brake is actuated when the drum is rotating in one direction, the drum reaction is taken by one set of anchor pins, and when the direction is reversed the drum reaction is taken by the other pair of anchor pins. Also, the mechanism possesses a further highly desirable function of so functioning that each shoe functions as a leading shoe in both directions of drum rotation, with the result that controlled degrees of self-energizing action may be secured.

*Operation*

Assuming that the drum is rotating counterclockwise, (Figure 1) and hydraulic or pneumatic pressure is applied to cylinder 74, piston rod 75 moves outwardly and rocks the lever assembly counterclockwise about the axis of anchor pin 15. This action, through trunnion 79, forces the brake shoe outwardly against the action of spring 72 and spring 44, which constantly urges the abutment faces of the shoe toward their links. The resulting substantially horizontal movement of the shoe causes slight clearances to develop between the shoe abutment faces and their links. Whether or not the clearances developed are equal is immaterial because, as soon as contact of the shoe is made with the drum, the shoe may rock slightly about the axis of trunnion 79 and bring its full surface into engagement with the drum, thereby effectively avoiding "high spots" or areas of high localized pressures, and insuring long life of the brake lining.

As soon as the shoe has been brought into engagement with the drum as just described, the braking torque reaction carries the shoe a slight angular distance, so as to tightly engage its abutment face 38 with abutment member 41, and if for any reason a clearance exists between them member 41 is automatically rocked so as to bring them into full surface engagement.

Under the conditions just described, and considering the shoe shown in Figure 1 alone, the brake is fully applied and the drum reaction is taken solely by lower anchor pin 15. A slight clearance exists between the upper end of the brake shoe and its abutment member 42, because the outward movement of the lever in combination with the drum reaction has separated these surfaces against the action of spring 72. The opposite shoe (not shown) functions in exactly the same way for clockwise rotation of the drum as the illustrated shoe for counterclockwise rotation, since the levers are fulcrumed the same side of the axis of rotation.

In view of the foregoing, it is apparent that, if the upper or lower end of the shoe should first engage the drum during the initial stage of brake operation, it will merely result in the shoe being bodily rocked into full surface engagement with the drum, and there is accordingly no possibility of "toe grab" or greater lining wear at one end than the other.

The brake of the invention is accordingly free from all of the disadvantages of the prior art, possesses the advantages over the slotted shoe type of brake of applying the pressures approximately centrally of the brake shoe, and in addition each shoe functions as a leading shoe in both directions of rotation, as will now be pointed out.

Assuming that the drum is rotated in the opposite direction, namely, clockwise as viewed in Figure 1, and the brake actuated as before, the drum reaction torque forces the brake shoe angularly in a clockwise direction, so as to bring its surface 39 into tight engagement with abutment member 42. This transmits all of the braking reaction forces applied to the shoe to anchor pin 16. The bodily movement of the shoe in a clockwise direction in response to the torque reaction causes an increased clearance to develop between abutment surface 38 and abutment member 41, against the action of spring 44. This removes anchor pin 15 from the sphere of action entirely, and the shoe may be regarded during this operation as being floatingly anchored to pin 16 alone. In other words, the effectual anchor for the brake shoe has been shifted or transposed, through a reversal of rotation of the drum, from pin 15 to pin 16, and all of the advantages of the leading shoe, which includes a desirable degree of self-energization, realized for both directions of drum rotation.

It is also observed that during the braking operation the braking forces are constantly applied to the mid-portion of the shoe, thereby avoiding localized pressure at either end; insuring uniform pressure distribution; and at the same time permitting either end of the shoe to move inwardly and outwardly, so as to compensate for a slightly out-of-round brake drum.

It is, of course, understood that the shoe on the opposite side of the axis from the shoe illustrated functions in exactly the same way but at different times; namely, when the drum is rotating clockwise as just discussed, the shoe opposite the one shown will transmit the braking torque reaction to lower anchor pin 15, and when the drum is rotating in the opposite direction it will transmit the braking torque reaction to upper pin 16. In either event, both shoes possess the operating characteristics of a leading shoe in either direction of rotation of the drum, by reason of the transfer of the braking torque reaction forces from one set of anchor pins to the other upon reversal of drum rotation. Upon conclusion of the braking operation, the pressure is released from cylinder 74, and springs 44 and 72 return the shoes and levers to inoperative position, and there is no tendency, as in the shoe brakes of the prior art, for the disengaging operation to be delayed.

In order to simplify the disclosure, the foregoing description of the construction contains no mention of critical angles and dimensions of the parts used in the brake. The various factors which influence the operating characteristics of the brakes will be taken up separately as follows:

Brake lining span

In the prior pivoted shoe brakes, it is necessary to so limit the span of the lining as to seriously reduce the braking power of the mechanism. If the lining were carried too far at the toe end, serious "toe grab" would occur, and if it were carried too far under the heel of the shoe, little braking action would be obtained from that portion of the lining.

In the present construction the whole shoe is mounted for bodily translational movement, and the forces are applied approximately centrally of the shoe, so that the lining may be carried as far as is practicable without encountering the difficulties from shoe grab, and at the same time all parts of the lining bear with equal force against the drum. In the brake illustrated the angle E, indicating the span of the lining, is approximately 114 degrees, which has been found very satisfactory in actual operation. However, it is to be understood that the angular extent or span of the lining may be increased or decreased with respect to this value without departing from the spirit of the invention.

Abutment face inclination

For either direction of drum rotation there are three forces acting upon the shoe; namely, (1) the actuating force P acting through trunnion 79 substantially at the mid-point of the shoe, and directed substantially longitudinally, Figure 1; (2) the thrust or torque reaction $Q_1$ or $Q_2$ acting at 90° to the particular anchor pin (15 or 16) involved; and (3) the resultant drum reaction R passing through the intersection X of P and Q.

The force diagram may be solved vectorially in well known manner to locate point X. As shown in Figure 1, abutment faces 38 and 39 of the shoe are disposed at right angles to lines $Q_1$ and $Q_2$, respectively, drawn through the axes of the anchor pins and intersection X of lines P, R, $Q_1$ and $Q_2$. As seen in Figure 1, the resulting arrangement is perfectly symmetrical.

The point X is shown in the position illustrated in the drawings only by way of illustration of the theory of the brake, and it is to be understood that in practice its location will depend upon the coefficient of friction of the lining.

From the foregoing it is apparent that the invention is not limited to the abutment face inclinations disclosed, because they will vary in accordance with the location of the anchor pins, but in any event will be disposed normal to lines containing the anchor pin axes and the point of intersection of the three forces acting upon the shoe.

Anchor pin placement

In the brakes of the prior art it has been necessary to locate the anchor pins very close to the inner surface of the drum to avoid self-locking difficulties, especially those which occur through toe grab.

In the present construction no difficulties with the phenomena of toe grab or self-locking of the shoe are possible, and therefore the anchor pins may be moved inwardly to achieve an appreciable increase in braking power of the mechanism through an additional self-energizing action.

In the construction illustrated, pin 16 is located slightly closer to the axis than pin 15, in order to accommodate the actuating mechanism disclosed. However, since the braking power is maintained of constant value so long as the pins are maintained on reaction lines $Q_1$ and $Q_2$, the braking power will be the same when the drum is rotating counterclockwise as it is when it is rotating clockwise. Accordingly, the distances of the two anchor pins from the drum axis may be made equal or varied through substantial ranges to suit any particular layout because in order to achieve satisfactory operation it is only necessary to locate the pins along the lines $Q_1$ and $Q_2$, and so shape abutment faces 38 and 39 as to be disposed normal to lines $Q_1$ and $Q_2$, and this will produce equal braking effects for both directions of drum rotation.

Brake adjustment

If after the brake has been in use for some time the lining becomes so worn as to introduce an undesirable clearance between the lining and the drum, each nut 21 is loosened and pin 15 rotated sufficiently to cause the eccentric portion, acting through link 41, to advance the shoe toward the drum and compensate for the lining wear. Nuts 21 are then tightened and the adjustment is complete. As seen in Figure 1, rotation of the eccentric in either direction will advance the shoe toward the drum, but the one shown is preferably rotated counterclockwise, and the opposite one rotated clockwise to advance the shoe toward the drum.

In Figures 5 and 6 there is illustrated a modified construction for adjusting the lower anchor pins, also forming part of the invention. With continued reference to these figures, the parts which are similar to those of the construction just described will be given the same number with the subscript "a."

In this form of the invention a modified form of anchor pin 15a is used, each of which extends through an elongated slot 91 in foundation plate 10a.

Levers 51a and 52a, together with abutment member 41a, are pivoted on an enlarged concentric cylindrical portion 92 of each anchor pin 15a. The shoulder formed by enlarged portion 92 is adapted to be pulled into tight engagement with plate 10a by means of a nut 93, a lock washer 94, and an enlarged block member 95 fitting over each anchor pin. As seen in Figure 5, each block 95 is provided with a portion 96 depending below the anchor pins.

An adjusting member 97, having a central hexagon shaped portion, is provided with oppositely threaded portions 98 threaded into member 95.

By loosing nuts 93, so as to free the anchor pins for sliding movement in slots 91, member 97 may be rotated to move blocks 95 toward and away from each other so as to increase or decrease the clearance that exists between the brake lining and the drum. When the adjustment is completed nuts 93 are then tightened to permanently lock the anchor pins in their new positions.

The term brake shoe in the appended claims is intended to embrace the shoe illustrated embodying the shoe proper and lining 36, but it is to be understood that it also covers brake shoes having an integral braking face.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism, a brake drum; a support mounted in cooperative relationship to said brake drum; a brake shoe carried by said support and movable toward and away from said brake drum; means for forcing said shoe toward said drum; an abutment member carried by said support and cooperating with one end of said shoe for restraining it against rotation in response to rotation of said drum in one direction; a second abutment member carried by said support and coacting with the other end of said shoe for restraining it against rotation in response to rotation of said drum in the opposite direction; one of said abutment members being located closer to the axis of the drum than the other, and said brake shoe having flat faces adjacent its ends cooperating with said abutment members, said abutment members each permitting free, substantially radial outward movement of the ends of said shoe, and slight bodily rocking of said shoe about either of said abutment members as a fulcrum, so as to insure full surface engagement of the shoe with the drum when the latter is rotating in either direction, the flat faces of said brake shoe being inclined differently from the other sufficiently to compensate for the differential placement of said abutment members with respect to said axis, and effect similar braking characteristics in both directions of drum rotation.

2. The brake mechanism defined in claim 1, wherein said shoe is provided with a flat, substantially non-radial face at each end thereof coacting with flat faces on said abutment members.

3. In a brake assembly, a foundation plate; a pair of anchor pins carried by said plate and spaced apart circumferentially; a brake actuating lever mounted for pivotal movement on one of said pins; a brake shoe disposed in operative relationship with respect to said plate and being provided adjacent each end with an abutment face disposed in proximity to said anchor pins; an abutment member pivotally mounted on each of said anchor pins and coacting with the abutment faces of said brake shoe, and being free to rock into various positions in response to forces applied thereto; means for rocking said lever about said one pin; and means for transmitting forces from said lever to said brake shoe.

4. In a brake assembly, a foundation plate; a pair of anchor pins carried by said plate and spaced apart circumferentially; a brake actuating lever mounted for pivotal movement on one of said pins, a brake shoe disposed in operative relationship with respect to said plate and being provided adjacent each end with an abutment face adjacent said anchor pins; an abutment member pivotally mounted on each of said anchor pins and coacting with the abutment faces of said brake shoe, and being free to rock into various positions in response to forces applied thereto; means for rocking said lever about said one pin; and means for transmitting forces from said lever to said brake shoe, said abutment faces being inclined with respect to radii intersecting said anchor pins so as to impart predetermined braking characteristics to said brake shoe when it is engaged with one of said pivotally mounted abutment members.

5. In a brake assembly, a foundation plate; a pair of anchor pins carried by said plate and spaced apart circumferentially; a pair of brake actuating levers mounted for pivotal movement on one of said pins; a brake shoe disposed in operative relationship with respect to said plate and having a web-like portion disposed between said levers and terminating at each end in an abutment face adjacent said anchor pins; an abutment member pivotally mounted on each of said anchor pins coacting with the abutment faces of said brake shoe and being free to rock into various positions in response to forces applied thereto; means for rocking said levers about said one pin; and means for transmitting forces from said levers to said brake shoe intermediate the ends of the latter.

6. In a brake mechanism, a brake drum; a support mounted adjacent said drum; a pair of anchor pins carried by said support at points circumferentially spaced around said drum; an abutment member pivotally mounted on each of said pins and each having an abutment face; and a brake shoe disposed within said drum intermediate said abutment members and having abutment faces coacting with the abutment faces of said members, and each being disposed substantially at different angles to radii passing through axes of their respective anchor pins.

7. In a brake mechanism, a brake drum; a support mounted adjacent said drum; a pair of anchor pins carried by said support at points circumferentially spaced around said drum; an abutment member pivotally mounted on each of said pins, and each having an abutment face; and a brake shoe disposed within said drum intermediate said abutment members and having abutment faces coacting with the abutment faces of said members, one of said pins being located closer to the axis of said drum than the other, and said abutment faces of said brake shoe each being disposed at a predetermined angle with respect to lines passing through said anchor pins and the center of pressure of said shoe.

8. In a brake mechanism, a support and a brake drum mounted in cooperative relationship; a rigid brake shoe disposed within said brake drum in cooperative relationship to said drum and having substantially flat abutment faces at its opposite ends disposed in fixed relationship to each other; and a pair of pivoted members carried by said support and having substantially flat abutment faces adapted to coact in surface engagement with the abutment faces of said shoe, said brake shoe being wholly disposed within an arc of 180° of the brake drum, said pivoted members constituting the sole means for transmitting brake torque reaction from said shoe to said support, and adapted to be rocked freely about their axes by said brake shoe abutment faces, while maintaining surface engagement therewith.

9. In a brake mechanism, a support; a rockable member carried by said support; a pair of spaced levers fulcrumed on said member, said member also having an eccentric portion intermediate said levers; and a brake shoe abutting element fitting over said eccentric portion, and adapted to be advanced and retracted when said member is rocked, said member being so designed as to maintain said levers in fixed positions with respect to the axis of said member when the latter is rocked.

10. In a brake mechanism, a support; a rockable member carried by said support and having spaced large and small diameter concentric journal portions; a pair of spaced levers fulcrumed on said large and small diameter portions, said member also having an eccentric portion intermediate said large and small diameter portions; and a brake shoe abutting element fitting over said eccentric portion, and adapted to be advanced and retracted when said member is rocked, said member maintaining said levers in fixed positions with respect to the axis of said member when the latter is rocked.

11. In a brake mechanism, a support; a pair of levers disposed in spaced apart relationship and mounted for pivotal movement on said support; a brake shoe mounted for floating movement on said support and having a web portion disposed between said levers; a pivot member journalled in the web portion of said brake shoe; said pivot member having a pair of recesses therein for receiving one side of each of said levers and for transmitting forces from the latter to said brake shoe, said recesses providing large area bearing surfaces for the sides of said lever and permitting free sliding movement of said shoe with respect to said levers.

12. In a brake, a support; a brake drum mounted for rotation adjacent said support; a brake shoe carried by said support and mounted for movement toward and away from said brake drum; a lever pivotally mounted on said support and having its free end disposed adjacent one end of said brake shoe; means for transmitting forces from said lever to said shoe intermediate its length; and common means for urging the free end of said lever and said one end of said shoe away from said drum and permitting independent movement thereof, comprising a tension spring having independent connections with said lever and said brake shoe.

13. In a brake, a brake drum; a support mounted adjacent said drum; two pairs of circumferentially spaced members pivoted for free rocking movement on said support; a brake shoe disposed between each pair of said members and having abutment faces cooperating therewith to restrain said shoe against rotation in response to braking forces; said abutment faces being inclined with respect to lines passing through the axis of said drum and said members, adapted to maintain surface engagement with the abutment face of one of said members in either direction of drum rotation and impart predetermined braking characteristics to said brake shoe in either direction of rotation of said drum.

14. The brake mechanism defined in claim 13, wherein one member of each pair is adjustable toward and away from said drum for compensating for the effects of brake lining wear.

15. In a brake, a support and a brake drum mounted in cooperative relationship; a pair of anchor pins carried by said support and circumferentially spaced apart with respect to said brake drum; said pins being disposed to the same side of a plane containing the drum axis; a rigid brake shoe disposed in operative relationship with respect to said support and located to the same side of the drum axis as said pins and being provided adjacent each end with an abutment face disposed in proximity to said anchor pins; an abutment member pivotally mounted on each of said anchor pins and coacting with the abutment faces of said brake shoe, and being free to rock into various positions in response to forces applied thereto by said shoe; a pivoted actuating lever for rocking said shoe; and means for transmitting forces from said lever to said brake shoe adjacent the mid-portion thereof.

16. In a brake, a support; fulcrum means carried by said support; a lever assembly pivotally mounted on said fulcrum means and comprising a pair of levers secured together in spaced apart relationship; a brake shoe mounted on said support and having a web portion slidably disposed between said levers; means for transmitting forces from said lever assembly to said shoe comprising a force transmitting member having pivotal movement upon a large area curved surface on the web of said brake shoe, and having sliding movement upon a large area flat surface on said lever assembly.

17. In a brake, a support; a brake drum mounted for rotation adjacent said support; a brake shoe carried by said support and mounted for movement toward and away from said brake drum; a lever pivotally mounted upon said support and having its free end disposed adjacent one end of said brake shoe; means for retracting said brake shoe and lever, comprising a tension spring; a link connecting one end of said tension spring to the free end of said lever assembly, and a second link connected to said spring end and anchored to one end of said brake shoe.

18. The brake defined in claim 17, wherein said links are disposed at an angle of approximately 90° to each other and the line of action of said spring substantially bisects said angle, whereby the action of the spring upon said brake shoe is restricted to a direction substantially normal to said first link.

19. In a brake, a support; a brake drum mounted for rotation adjacent said support; a pair of substantially axially directed anchor pins carried by said support and disposed in circumferentially spaced relationship; an abutment member mounted for free rocking movement upon each of said anchor pins and having a substantially flat bearing face extending a substantial distance in either direction from a line normal to said bearing face and passing through the axis of said anchor pins; abutment faces adjacent the ends of said brake shoe having areas substantially coextensive with the area of the bearing faces of said abutment members and operable to coact in full surface engagement with one abutment member when the brake is applied in one direction of drum rotation, and to coact in full surface engagement with the other abutment member when the drum is rotating in the other direction; and lever means for applying braking forces to said brake shoe intermediate its length.

20. The brake construction defined in claim 19, wherein said bearing faces, measured in a direction normal to the drum axis, each have a length materially greater than the distance of said bearing faces from the axis of said anchor pin, for insuring free rocking of said abutment members in response to the application of braking reaction forces thereto by said shoe.

21. The brake construction defined in claim 19, together with means for adjustably decreasing the circumferential spacing of said abutment members, to compensate for the effect of brake lining wear.

22. The brake construction defined in claim 19, wherein one of said abutment members is pivoted upon an eccentric portion provided on its pin, and the latter is mounted for adjustment into a plurality of angular positions, for adjustably varying the circumferential spacing of said abutment members, to compensate for the effect of brake lining wear.

23. In a brake mechanism, a brake drum; a support mounted adjacent said brake drum; a pair of circumferentially spaced anchors on said support; a brake shoe assembly disposed between said anchors and having abutment means cooperating therewith to restrain said shoe against rotation in response to braking forces, and operable to permit either end of said shoe assembly to move toward or away from said drum; a brake shoe actuating lever assembly pivoted adjacent one of said anchors; means for transmitting forces from an intermediate portion of said lever assembly to an intermediate portion of said shoe assembly, comprising a force transmitting member having a large area curved surface cooperating in surface engagement with a large area curved surface means on one of said assemblies, and also having a large area flat surface cooperating in sliding engagement with a large area flat surface means on the other assembly; and means for rocking said lever.

24. The brake mechanism defined in claim 23, wherein said lever assembly comprises a pair of spaced levers and said brake shoe comprises a web disposed between said levers, and said flat surface means comprises a flat surface on each of said levers, and said curved surface means comprises a curved surface on said brake shoe web.

WILLIAM R. SPILLER.
HERBERT W. ALDEN.
RALPH K. SUPER.